Patented Oct. 10, 1939

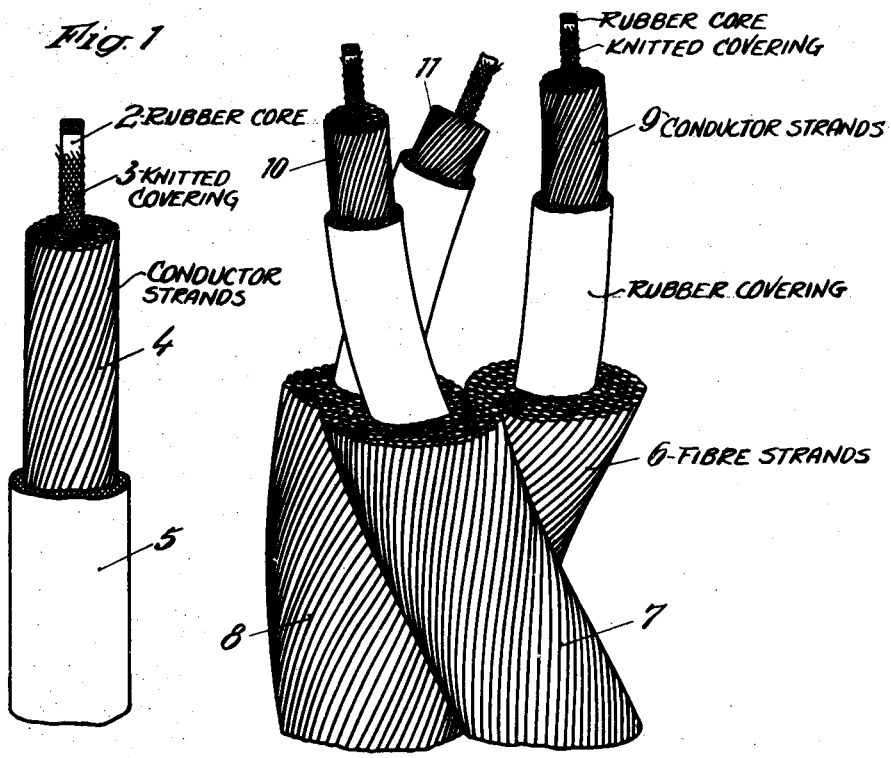
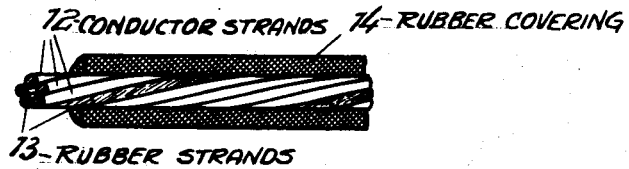

2,175,389

UNITED STATES PATENT OFFICE 2,175,389

ELECTRICALLY CONDUCTING WHALE LINE

Ferdinand Hanff, Berlin-Charlottenburg, Germany, assignor to Siemens-Schuckertwerke, Aktiengesellschaft, Berlin-Siemensstadt, Germany, a corporation of Germany Original application May 16, 1934, Serial No. 725,911. Divided and this application April 30, 1936, Serial No. 77,162. In Germany May 18, 1933

1 Claim. (Cl. 174—113)

My invention relates to improvements in harpoon lines and in particular to electric current conducting harpoon lines consisting of a plurality of individual cables or strands.

For hunting larger marine animals, especially whales, in recent times use is made of the electric current, by which the animal to be caught is killed. For this purpose harpoon lines are necessary which transmit the current from its source on the whaling vessel through the harpoon, shot into the animal's body, to the animal. From there it returns through the water and the vessel's hull to the source of the current.

Whale lipes consisting of hemp rope and electric conductors hitherto used for this purpose have the drawback that owing to the required great strength, they must be comparatively thick and become, therefore, quite heavy. Consequently when the harpoon is discharged, the line which is taken along by it offers a large resistance in running off. It greatly impedes the harpoon, which for that reason flies with a considerable reduced impetus and therefore often misses its target altogether or strikes it with only a small force. With such prior art whale lines therefore only marine animals which are close to the vessel can be harpooned. These aforementioned defects are partly also caused by the lack of sufficient flexibility and pliability of the line. For the latter reason the coiling of the line on deck close to the cannon before the discharge of the harpoon becomes also a matter of some difficulty.

A further disadvantage of the heretofore known whale lines is that the electric conductor is apt to become entangled or kinked when the harpoon is discharged and during its flight. Frequently the accelerated force coming into action when the harpoon is fired causes the hemp line or the electric conductor, or both, to become entangled or the electric conductor to separate from the hemp line or to tangle up by itself. Thereby the hemp line and also the material of the electric conductor are severely strained and the durability of the whale line is thereby considerably reduced. It often also occurs that owing to the entangling, the harpoon somersaults which causes it to deviate from its intended trajectory so that it is apt to miss its target or that it only wounds the animal without holding it.

According to my invention these drawbacks heretofore inherent to whale lines composed of individual conducting cables and hemp ropes are obviated by stranding the individual main strands together in a direction contrary to that in which the constituent strand elements or sub-strands of the main strands are laid. With this construction each individual main strand may consist of stranded individual sub-strands which are surrounded by a rubber covering. It is, for instance, advantageous to make each main strand of three individual sub-strands covered with hemp and rubber and which sub-strands in themselves are stranded together with an inserted rubber core and padding.

These aforementioned novel expedients are more particularly described, shown and claimed in my copending application Serial No. 725,911 filed May 16, 1934, of which the present application is a division. The subject matter of the present application relates in particular to those novel features also shown and described in the aforementioned parent application, according to which, due to the special construction, a longitudinal resiliency is imparted to the current conducting strands, at least equal or greater than the resiliency of the fibre strands which surround the conductors or with which the fibre strands are laid.

This longitudinal resiliency is imparted to the conducting strands by laying the individual strands of which the main conductor is composed spirally at a comparatively short pitch around a rubber core, and by taking care that a suitable space is left between the individual wire strands. Of course these individual wire strands may again be composed of stranded wire. Around this stranded main conductor is then wrapped an insulating and water-tight rubber covering. This conductor is then used as a core for the outer fibre portion of the harpoon line. By this construction the effect is attained that owing to the short pitch of the conductor strands and the spaces left between the strands the constituent elements of this conductor have comparatively large freedom of motion relatively to one another in transverse direction, tending nevertheless, owing to the resiliency of the rubber core, to return to their normal length after the stress has ceased.

Since in this stretching action the rubber core is mechanically stressed and subject to wear it is surrounded according to the present invention with a knitted cover before the conductor strands are laid around it. A knitted covering which may be arranged and produced for instance in the manner shown in the Reissue Patent No. 19,551 to Franz Meiwald, has the great advantage that, contrary to the heretofore customary braided coverings, it offers very little resistance to the stretching of the rubber, because the loops of the knitting stretch sufficiently to avoid unnecessary stress upon the covering.

The longitudinal resiliency of the entire electric conductor may be further enhanced by laying rubber strands into the interstitial space between the individual conductor strands. Such rubber strands are compressed when the cable is stretched and avoid at the same time the shifting of the individual conductor strands relatively to one another so that the entire conductor always retains its shape.

My invention is illustrated in the accompanying drawing in which

Fig. 1 shows in perspective view and in greatly enlarged scale the conducting portion of a whale line;

Fig. 2 shows in perspective view and also greatly enlarged the entire whale line composed of three conducting strands, each surrounded by the necessary amount of fibre stranding; and Fig. 3 shows in longitudinal section a portion of the conducting cable in which rubber strands are laid between the individual conductor strands of which the cable is composed.

Referring to Fig. 1, the rubber core is denoted with 2, the knitted covering surrounding the rubber core is denoted with 3, and 4 are conductor strands laid around the covered rubber core. The entire conducting cable is surrounded by an insulating rubber covering 5. The conducting strands 4, for instance copper wire, which each in itself may be composed of fine strands, may be laid in one or several layers, preferably with interstitial spaces between the adjacent strands in each layer. While the rubber core 2 is shown in Fig. 1 having a square cross-section, it may have, of course, any other suitable cross-section.

Such a cable as shown at 9 in Fig. 2 is then surrounded by a suitable number of layers of fibre strands 6 to form one of the main strands of the whale line, and for instance three of such main strands 6, 7 and 8 are twisted together. It is not necessary that all three main strands of the whale line contain an electric conductor as a core as shown in Fig. 2. It is sufficient if one or two of the main strands are so equipped, since the principle in accordance with which the line is used involves only one current carrying conductor, because the water is used as a return conductor.

In Fig. 3 is more particularly shown the manner in which the stranded electric conductor may be made longitudinally more resilient by also inserting rubber strands 13 between the adjacent conductor strands 12. 14 denotes in this case the insulating rubber jacket which surrounds the entire conductor. When such a conductor is subject to longitudinal stresses the spiral rubber strands are compressed by the adjacent conductor strands and when the stresses cease they force the conductor strands back into their normal position.

A line equipped with such a conductor not only has longitudinal resiliency, but has by far less tendency to kink. It also has the great advantage that the initial impact upon the line in longitudinal direction which occurs when the harpoon is fired is to a large extent absorbed by this longitudinal resiliency of the line.

I claim:

An electrically conducting non-kinking harpoon line consisting of a plurality of twisted main fibre strands in at least one of which is embedded an electric cable, said cable having means for imparting to it a longitudinal resiliency at least equal to the resiliency of said main fibre strands, said means comprising a rubber strand element having a cross section deviating from circular cross section and forming the core, a knitted fibre covering surrounding said core, a plurality of electrically conducting wire strands laid spirally with a short pitch and in spaced relation to one another around said core and a layer of insulating rubber surrounding said strands.

FERDINAND HANFF.